United States Patent
Van Der Huizen et al.

(10) Patent No.: US 8,163,838 B2
(45) Date of Patent: Apr. 24, 2012

(54) PROCESS FOR THE PREPARATION OF AN ARTIFICIAL LATEX

(75) Inventors: Adrie A. Van Der Huizen, Castrium (NL); Marc S. Sonderman, Purmerend (NL); Arwin W. Van Der Waal, Ammerstol (NL); Wouter De Jong, Almere (NL); Anton Nicolai, Hardewijk (NL)

(73) Assignee: Kraton Polymers US LLC, Houston, TX (US)

( * ) Notice: Subject to any disclaimer, the term of this patent is extended or adjusted under 35 U.S.C. 154(b) by 353 days.

(21) Appl. No.: 12/296,457

(22) PCT Filed: Dec. 18, 2007

(86) PCT No.: PCT/EP2007/011482
§ 371 (c)(1),
(2), (4) Date: Oct. 8, 2008

(87) PCT Pub. No.: WO2008/074513
PCT Pub. Date: Jun. 26, 2008

(65) Prior Publication Data
US 2009/0281211 A1 Nov. 12, 2009

(30) Foreign Application Priority Data
Dec. 21, 2006 (EP) .................... 06026583

(51) Int. Cl.
*C04B 24/28* (2006.01)
(52) U.S. Cl. ........ 524/571; 523/336; 523/337; 523/340; 523/343; 516/925; 516/53; 524/801; 524/2; 524/575.5; 366/147
(58) Field of Classification Search .................. 523/336, 523/337, 340, 343; 516/925, 53; 524/801, 524/2, 575.5, 571; 366/147
See application file for complete search history.

(56) References Cited

U.S. PATENT DOCUMENTS
2,595,797 A 5/1952 Leyonmark et al.
(Continued)

FOREIGN PATENT DOCUMENTS
DE 2245370 A1 3/1973
(Continued)

*Primary Examiner* — Vasu Jagannathan
*Assistant Examiner* — Mark Kaucher
(74) *Attorney, Agent, or Firm* — Clements Bernard PLLC; Michael A. Masse

(57) ABSTRACT

A process of producing an artificial latex, comprising the steps:
(a) cement formation, wherein a rubber is dissolved in a suitable hydrocarbon solvent;
(b) emulsification of the cement formed in step (a), together with an aqueous soap solution, thus forming an oil-in-water emulsion;
(c) hydrocarbon solvent removal, resulting in a latex of the rubber having particles of a median particle size in the range of from about 0.5 to 2.0 μm, and optionally
(d) latex concentration, forming an artificial latex with a higher solids content, characterized in that in step (b) a premix is formed first, which is subsequently homogenized into an oil-in-water emulsion, and wherein the premix is formed by mixing the cement with the aqueous soap solution at a volume ratio of 1:1.5 to 1:3 using at least one homogenizer comprising a stator and a rotor, that is operated at a tip speed of the outer ring of the rotor in the range of from 8 to 16 m/s, and wherein the premix is subsequently homogenized in a rotor/stator homogenizer operated at a tip speed of the outer ring of the rotor in the range of from 16 to 35 m/s.

1 Claim, 1 Drawing Sheet

U.S. PATENT DOCUMENTS

| | | | |
|---|---|---|---|
| 2,799,662 A | | 7/1957 | Ernst et al. |
| 2,947,715 A | | 8/1960 | Charlet et al. |
| 2,955,094 A | | 10/1960 | Brodkey et al. |
| 3,007,852 A | | 11/1961 | Hunter et al. |
| 3,195,867 A | * | 7/1965 | Mould, Jr. .................... 366/305 |
| 3,249,566 A | | 5/1966 | May |
| 3,250,737 A | | 5/1966 | Halper et al. |
| 3,261,792 A | | 7/1966 | Halper et al. |
| 3,268,501 A | | 8/1966 | Crouch et al. |
| 3,277,037 A | | 10/1966 | Halper et al. |
| 3,281,386 A | | 10/1966 | Moss |
| 3,285,869 A | * | 11/1966 | Ronay et al. .................. 523/339 |
| 3,287,301 A | | 11/1966 | Fysh et al. |
| 3,294,719 A | | 12/1966 | Halper et al. |
| 3,310,151 A | | 3/1967 | Carter |
| 3,310,515 A | | 3/1967 | Halper et al. |
| 3,310,516 A | | 3/1967 | La Heij et al. |
| 3,313,759 A | | 4/1967 | La Heij et al. |
| 3,320,220 A | | 5/1967 | Di Drusco et al. |
| 3,424,705 A | | 1/1969 | La Heij et al. |
| 3,445,414 A | | 5/1969 | Glymph et al. |
| 3,503,917 A | | 3/1970 | Burke, Jr. |
| 3,582,967 A | | 6/1971 | Beckman et al. |
| 3,622,127 A | | 11/1971 | Burke, Jr. |
| 3,644,263 A | | 2/1972 | Burke, Jr. |
| 3,652,482 A | | 3/1972 | Burke, Jr. |
| 3,719,572 A | | 3/1973 | Burke, Jr. |
| 3,808,166 A | | 4/1974 | Bruzzone et al. |
| 3,815,655 A | | 6/1974 | Burke, Jr. |
| 3,839,258 A | | 10/1974 | Visseren et al. |
| 3,842,052 A | | 10/1974 | Gordini et al. |
| 3,862,078 A | * | 1/1975 | Burke, Jr. .................... 523/335 |
| 2,871,137 A | | 3/1975 | Grammatico |
| 3,879,326 A | | 4/1975 | Burke, Jr. |
| 3,879,327 A | | 4/1975 | Burke, Jr. |
| 3,886,109 A | | 5/1975 | van Hardeveld et al. |
| 3,920,601 A | | 11/1975 | Yoshioka et al. |
| 3,982,698 A | | 9/1976 | Anderson |
| 4,160,726 A | | 7/1979 | DelPico |
| 4,243,566 A | | 1/1981 | Burke, Jr. |
| 4,344,859 A | | 8/1982 | Burke, Jr. |
| 6,075,073 A | | 6/2000 | McGlothlin |
| 6,103,786 A | | 8/2000 | Hoch et al. |
| 2003/0088005 A1 | * | 5/2003 | Lin et al. ...................... 524/313 |
| 2009/0209698 A1 | * | 8/2009 | Van Der Huizen et al. .. 524/571 |
| 2011/0112217 A1 | * | 5/2011 | van der Waal et al. ....... 523/340 |

FOREIGN PATENT DOCUMENTS

| | | |
|---|---|---|
| DE | 10024813 A1 | 11/2001 |
| FR | 2153913 A5 | 5/1973 |
| GB | 1004441 | 9/1965 |
| GB | 1162569 | 8/1969 |
| GB | 1199325 | 7/1970 |
| GB | 1296107 | 11/1972 |
| GB | 1327127 | 8/1973 |
| GB | 1384591 | 2/1975 |
| GB | 2051086 A | 1/1981 |
| JP | 48-38337 | 9/1971 |
| JP | 51-80344 | 1/1975 |
| JP | 54124042 A | 9/1979 |
| JP | 56161424 A | 12/1981 |
| JP | 58091702 A | 5/1983 |
| JP | 58147406 A | 9/1983 |
| JP | 1123834 A | 5/1989 |
| NL | 7212608 A | 3/1973 |
| RO | 102665 A2 | 12/1991 |
| SU | 1014834 A1 | 4/1983 |
| SU | 1058974 A1 | 12/1983 |
| SU | 1375629 A1 | 2/1988 |
| SU | 520769 A1 | 2/1992 |

* cited by examiner

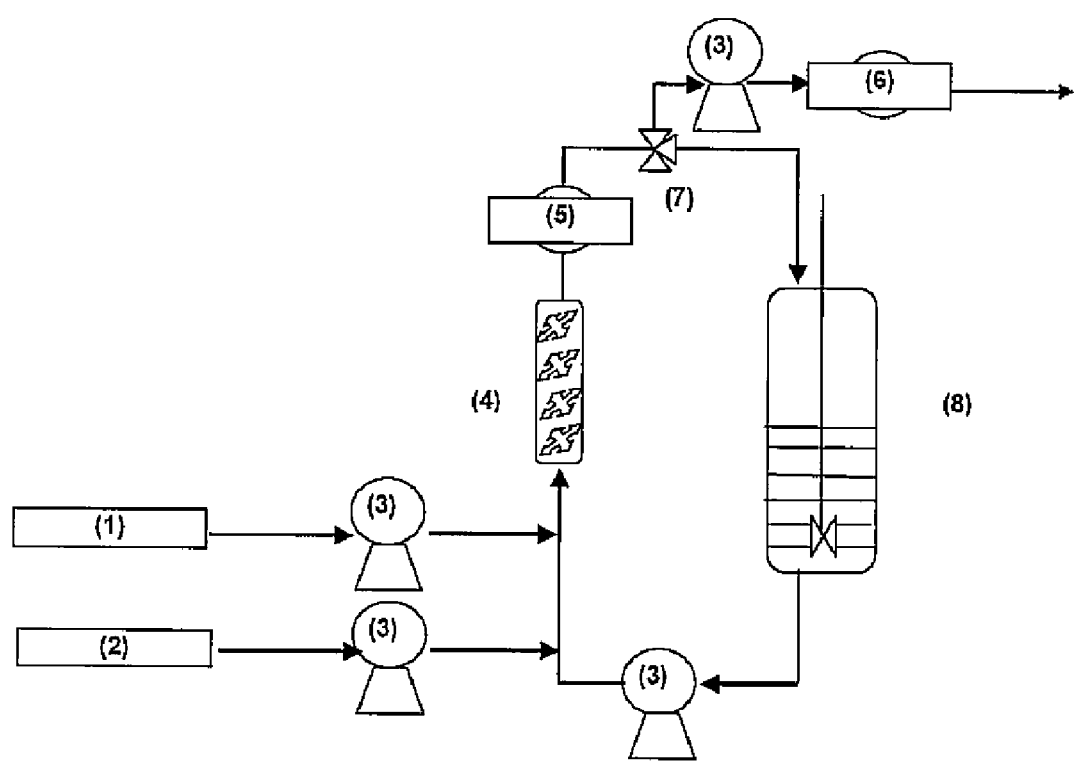

PROCESS FOR THE PREPARATION OF AN ARTIFICIAL LATEX

TECHNICAL FIELD

The present invention concerns a process of producing an artificial latex, comprising a man-made emulsion of a rubber in water. More in particular, the invention concerns the preparation of a conjugated diene polymer latex, more specifically an isoprene rubber latex.

BACKGROUND ART

Both natural and synthetic rubber latexes are emulsions of rubber in water. The emulsions are stabilized with proteins or surface-active agents. The median diameter of rubber particles average varies from 0.5 to 2.0 micron. It may be as low as 0.1 micron for some synthetic latexes and tends to be nearly 1 micron for natural latex. The term "latex" is applied to synthetic as well as natural products, and stems from the botanical name of the milky fluid that is derived from rubber trees and which is the source of natural rubber. The term "serum" is used for the aqueous medium.

Processes for producing artificial latexes have been known for many years. For instance, the process in U.S. Pat. No. 2,595,797 provides the following steps:
1. preparing a solution of a rubber in a water-insoluble volatile organic solvent in a concentration sufficient for emulsification;
2. introducing the solution under pressure into water containing a surface active agent;
3. adding an antifoamant (e.g., polysilicone oil) and agitating the mixture until emulsion is obtained;
4. removing the solvent by flashing (whilst avoiding excessive foaming), and
5. concentrating the solids content of the latex by allowing it to stand for 24 hours and removing some of the serum.

In U.S. Pat. No. 2,799,662 a similar process is described. The method consists of a number of integrated steps which include the dissolving of the dry polymeric material in a suitable selected solvent, dispersing the thus prepared polymer solution into a carefully selected and adjusted water-emulsifier system and, finally, stripping out the solvent to leave the polymer dispersion as artificial latex. According to this reference, it is highly desirable to have present two emulsifiers, one of the type which is hydrocarbon soluble (e.g., alkali metal petroleum sulfonates having 20 to 21 carbon atoms arranged in an alkyl-aryl structure) and one of the water soluble type (e.g., alkali metal sulphate derivatives of higher alcohols). Emulsification of the polymer solvent mixture is accomplished under conditions preventing flashing of the solvent.

The problem of emulsion stability when stripping off the solvent is addressed in U.S. Pat. No. 2,871,137, which provides a method for preparing emulsifying agents based on the hydrocarbon polymers that are emulsified.

A method for preparing stable emulsions of polymeric or resinous materials is furthermore described in U.S. Pat. No. 2,947,715. This is accomplished by dissolving the rubber or resin in a suitable solvent, adding a creaming agent to the polymer solution during emulsification, and creaming the resultant latex prior to removal of the solvent, removing the solvent and then again creaming the solvent-free latex.

In U.S. Pat. No. 2,955,094, ortho-phosphoric acid and organic sulphate salts are used as emulsifiers. As indicated in this reference, experience has shown that latexes are relatively unstable and tend to coagulate when subjected to mechanical stress. Mechanical instability may be brought about by the simple movement of an agitator stirring the colloid. Maintenance costs are increased because the equipment becomes coated with the coagulated rubber and furthermore, an appreciable quantity of the rubber is lost. Another type of instability encountered with polymer latexes is that they oil-out and develop coagulum during the solvent stripping step.

U.S. Pat. No. 3,250,737 sets out to produce concentrated latexes of synthetic elastomers from organic solutions thereof in a manner that is both rapid, efficient and economical. This is accomplished by mixing a solution of a synthetic elastomer in an organic solvent, water and an emulsifying agent, homogenizing the mixture at least until the resulting emulsion is stable, stripping the organic solvent at elevated temperatures and pressures below conditions at which water boils, centrifuging the resulting dilute aqueous latex, recovering and recycling the aqueous serum from the said centrifuging step and recovering the concentrated latex. This reference concentrates on the steps of flashing and centrifuging, it is immaterial how the hydrocarbon solution is made.

Of particular interest are continuous processes for preparing artificial latexes, comprising a continuous emulsification step. Patent references describing continuous emulsification steps are manifold; examples thereof include: U.S. Pat. Nos. 3,622,127; 4,344,859; 4,243,566; 3,879,327; 3,862,078; 3,892,698; 3,879,326; 3,839,258; 3,815,655; 3,719,572; 3,652,482; 3,644,263; 3,294,719; 3,310,515; 3,277,037; 3,261,792; 3,249,566; 3,250,737 and 2955094, as well as GB1384591; FR2172455 and NL7212608. These references describe the need for ultradispersing equipments or homogenizers of various sorts.

A further reference of interest on this process step is EP0863173, which relates to (claim 1):

A process for preparing stable polymer dispersions with polymer particle sizes of 0.1 to 10 µm [d50 determined in an ultracentrifuge], characterized in that a water-in-oil emulsion, comprising a polymer dissolved in an organic solvent which is immiscible with water (organic phase) and an aqueous phase, wherein:
the viscosity of the organic phase is 1.0 to 20,000 mPa·s (measured at 25° C.);
the surface tension between organic and aqueous phase is 0.01 to 30 mN/m;
the particle size of the water emulsified in the organic phase is 0.2 to 50 mm and the ratio by volume of organic phase to aqueous phase is in the range of from 80:20 to 20:80,
is subjected to a shear process at a shear power of $1 \times 10^3$ to $1 \times 10^8$ Watts/cm$^3$, and wherein the water-in-oil emulsion is converted into an oil-in-water emulsion. This process is specifically dedicated to dispersions having very small particle sizes. Moreover, the equipment to be used in this process is very hard to scale-up to commercial size.

The particle size and particle size distribution of the oil-in-water emulsion made at the emulsification step is important for reasons of latex stability, but also for subsequent use of the latex by companies preparing gloves, condoms and the like. In addition, it is at this stage that the particle size and the particle size distribution of the final aqueous emulsion are determined. On the other hand, it has been found that the molecular weight of isoprene rubber is reduced in this step, by mechanical degradation, which adversely affects the properties of the articles prepared there from. Thus, there is an interest in an improved (continuous) emulsification step that has little or no adverse impact on the molecular weight, whereas producing an oil-in-water emulsion that is both stable and composed of particles of the right size and size distribution.

For IR latex, the right particle size in the artificial latex is from about 0.5 to about 2 μm, whereas these particles will be larger in the preceding oil-in-water emulsion, due to the presence of solvent within the emulsified rubber/solvent particles.

It is therefore an object of the present invention to provide an improved process for the preparation of an oil-in-water emulsion to be used in the preparation of an artificial latex.

DISCLOSURE OF THE INVENTION

A process of producing an artificial latex, comprising the steps:
(a) cement formation, wherein a rubber is dissolved in a suitable hydrocarbon solvent;
(b) emulsification of the cement formed in step (a), together with an aqueous soap solution, thus forming an oil-in-water emulsion;
(c) hydrocarbon solvent removal, resulting in a latex of the rubber having particles of a median particle size in the range of from about 0.5 to 2.0 μm, and optionally
(d) latex concentration, forming an artificial latex with a higher solids content, characterized in that in step (b) a premix is formed first, which is subsequently homogenized into an oil-in-water emulsion, and wherein the premix is formed by mixing the cement with the aqueous soap solution at a volume ratio of 1:1.5 to 1:3 using at least one homogenizer comprising a stator and a rotor, that is operated at a tip speed of the outer ring of the rotor in the range of from 8 to 16 m/s, and wherein the premix is subsequently homogenized in a rotor/stator homogenizer operated at a tip speed of the outer ring of the rotor in the range of from 16 to 35 m/s.

In a preferred embodiment, a combination of two separate rotor/stator homogenizers is used. In a more preferred embodiment the rotor/stator homogenizer is used in combination with the static mixer in a recycle loop together with a circulation pump and a holding vessel.

BRIEF DESCRIPTION OF FIGURES IN THE DRAWINGS

The attached FIGURE is a schematic representation of a preferred embodiment of the process of the current invention. The FIGURE shows the introduction of soap (1), and cement (2), whereupon a premix is made using a pump (3), a static mixer (4), and a first homogenizer (5) and a holding vessel (8). The static mixer, the first homogenizer, the valve (7) and the holding vessel (8) are positioned in a recycle loop. After the premix is made, preferably in a continuous manner, it is homogenized in a second homogenizer (6). As shown in this FIGURE, the holding vessel may be a stirred vessel. However, this is not an essential feature. Not shown, but a viable alternative nonetheless involves a process wherein a single homogenizer is used, which is used in a (semi) batch process at a low tip speed first, to make the premix, followed at a higher tip speed to produce the stable oil-in-water emulsion. This description is not meant to restrict the scope of the invention.

MODE(S) FOR CARRYING OUT THE INVENTION

The rubber that is used to form the artificial latex can be any elastomer or rubber-like polymer known in the art. This includes for example polyisobutylene and copolymers thereof, polyvinyl compounds such as acrylic and methacrylic acid esters and polyvinyl ethers and also cellulose derivatives, copolymers of styrene and conjugated diene(s) and or acrylonitrile and (co)polymers of diolefins. A further class of polymers are copolymers prepared from ethylene and one other monoolefin having up to 8 carbon atoms, such as the elastomeric copolymer of ethylene and propylene, the copolymer of ethylene and butane-1, and the like. Still another class of rubber like polymers are terpolymers obtained from ethylene, propylene and a diene such as 1,5-hexadiene and the like. The process of the current invention is of particular interest for polymers made by polymerization in a hydrocarbon solvent, whereas it is of lesser interest for polymers made by emulsion polymerization.

Of particular interest are (co)polymers of diolefins, preferably conjugated diolefins, with butadiene and isoprene as the more preferred representatives of the diolefins. Preferably, these (co)polymers, are polymerized by solution polymerization to a high cis-1,4-content (at least in the order of about 90%). These (co)polymers are further characterized by a (very) high molecular weight, typically in the range of at least 1,000,000 g/mole. Most preferably, they are made by anionic polymerization in the presence of a lithium catalyst, thus ensuring a very low ash content. However, they may also be made with a Ziegler type catalyst. Most preferably, the rubber like polymer is isoprene rubber, for instance any one of the grades commercially available from Kraton Polymers.

Note that the process of the present invention can also be utilized in case an artificial latex is made using bales of natural rubber.

The rubber, preferably isoprene rubber, may be dissolved in any suitable hydrocarbon solvent. As for the solvent to be selected, its choice will depend somewhat on the exact nature of the rubber and the boiling point of the solvent itself. It is necessary that a solvent be used which will (quickly and easily) dissolve the rubber. For the less polar polymers used as rubber, aliphatic hydrocarbon solvents having from four up to about ten carbon atoms are useful. These include isopentane, cyclopentane, n-pentane, the hexanes, the heptanes, octane, and the like. For isoprene rubber, the preferred solvent is n-pentane.

The amount of the rubber dissolved in the solvent will depend on and be limited by the solubility of the polymer in the solvent. In the case of isoprene rubber, the preferred amount (expressed as solids content) is less than about 20 percent by weight, preferably from about 8 to about 17 percent by weight, more preferably from about 10 to about 15 percent by weight. Another way to define the maximum amount of rubber is by the viscosity of the cement, which should preferably be below 20,000 centipoises (room temperature).

The rubber like polymer may be dissolved into the hydrocarbon solvent by any ordinary means. For instance, it may be dissolved in the solvent (below the boiling temperature thereof) in a stirred tank. There are no specific conditions with respect to this preparatory step. Obviously, the safety conditions set out by the equipment manufacturer must be followed, and degradation of the rubber must be avoided.

After the cement is formed, it is emulsified together with an aqueous soap solution to form an oil-in-water emulsion. With regard to the aqueous soap solution to be utilized, in principle any soap may be used. However, since one of the problems underlying the invention is to avoid foreign material that restricts the use of the latex so produced, the soap is preferably food and skin approved. For preparation of an IR latex, preferably a rosin type soap is used.

The soap may be used in a concentration of between 0.5 and 5.0% by weight in water. More preferably, it is used in a concentration of between 0.75 and 3.0% by weight in water, still more preferably between 1.0 and 2.0% by weight in water. While more concentrated solutions may be used, they generally provide no advantages. Note in this regard that the hardness of the water used for the preparation of the soap solution can be important. Preferably very soft water (0-4 DH) or soft water (4-8 DH) should be used. Any ordinary means for making an aqueous soap solution is used for the preparation of the soap solution.

The volume ratio of soap solution versus cement is also rather predefined. Using too little soap will lead to a phase inversion, whereas using a significant excess will be troublesome in the subsequent step of removing the hydrocarbon solvent and in the subsequent step of concentrating the aqueous emulsion. Typically, the cement/soap ratio will range from about 1:1.5 to 1:3.0, preferably from 1:2.0 to 1:2.5, by volume.

As mentioned before, extensive emulsification studies have been carried out to reduce variability of particle size distribution, to maintain the (ultra high) molecular weight of the rubber like polymer and to ensure emulsion stability whilst keeping the particle size within the preferred range (about 0.5 to 2.0 μm). It has been found that these contradictory requirements can be met using the two-step approach wherein a rotor/stator homogenizer is used at two very different tip speeds.

The rotor/stator systems that may be used in the current process are commercial makes of the type manufactured, for example, by Janke & Kunkel GmbH & Co. (Ultra-Turrax), by Silverson, by Fryma (toothed colloid mill), by Cavitron (Cavitron) or by Krupp (Supraton). The rotor/stator systems may be constructed both as chamber, cavity or cone tools. Rotor/stator homogenizers that have been found to be very effective in the current operations are those that are made and sold by Cavitron Verfahrenstechnick, in particular the types that sold for the processing of paper pulp (Type CD series). A detailed description of the Cavitron homogenizer may be found in DE 10024813.

For scaling purposes, it has been found that the tip speed of the rotor with the largest diameter is the defining parameter, whereas it needs to meet the requirement as specified in the claim. A tip speed in the range of 8 to 36 m/s corresponds in a CD1000 homogenizer (with a rotor having a diameter of 58 mm), with a rotational speed of from 3,000 to 12,000 rpm, whereas in a larger rotor/stator (with a rotor having a diameter of 136 mm), this corresponds to 1,200 to 5,000 rpm. The homogenizer (or first homogenizer in the below described preferred embodiment) is preferably operated at a tip speed in the range of from 8 to 16 m/s, preferably from 9 to 15 m/s.

In the process of the present invention, the next step comprises the conversion of the premix into the oil-in-water emulsion. In this step the premix is homogenized at an elevated tip speed, in the range of from 16 to 35 m/s. The same homogenizer may be used. On the other hand, in an alternative and preferred embodiment, it has been found advantageous to utilize a second homogenizer, e.g. after the recycle loop comprising the first rotor/stator homogenizer, and before the solvent removal step. This may again be a rotor/stator homogenizer of the Cavitron® CD type. Preferably the premix is homogenized at a tip speed in the range of from about 18 to 30 m/s.

Although not essential, it is highly preferred to use a static mixer in the preparation of the premix. The particular type of static mixer that is utilized is not essential. There are various mixers available and in a pilot plant scale trial, a static mixer sold under the trade mark Primix has worked well.

Preferably, the static mixer and the rotor/stator homogenizer (#1) are part of a recycle loop further containing a holding vessel and a circulation pump. The cement and aqueous soap solution are introduced upstream from the static mixer and the homogenizer, whereas the product outlet and the holding vessel are downstream of the homogenizer. This loop is also shown in FIG. 1.

The effect of temperature on the emulsification step is rather small. This process step is typically carried out from ambient temperature to below the boiling temperature of the hydrocarbon solvent. On the other hand, the average residence time and cycle number has been found to be important parameters to meet the aforementioned requirements. Operating at an average residence time of from 5 to 20 minutes, for instance from 5 to 15 minutes, resulted in stable emulsions in all cases. Thus, no demixing was observed after several days standing at room temperature in a well closed container. Also, when these oil-in-water emulsions were used to produce the latex (by removal of the organic solvent little variation in the particle size was observed; generally values around the targeted 1.2-1.3 μm were found. On the other hand, a surprising effect on the molecular weight retention was found as a function of the number of recycles. Which could already be observed in the oil-in-water emulsion. Optimum homogeneity may be obtained using more than 5, preferably more than about 8 cycle numbers. On the other hand, and for process economical reasons, the number of cycle numbers should not be greater than 25, preferably not greater than about 15. Although this will vary on the basis of the residence time and the volume of the recycle loop as well as the addition rate, a cycle number of on average about 10 is preferred to retain the molecular weight.

The subsequent steps of solvent removal and latex concentration may be carried out similar to any of the processes already known in the art. This includes each of the prior art references referred to in paragraphs [0003] to [0009], included herein by reference, as well as NL287078; GB1004441; U.S. Pat. No. 3,249,566; U.S. Pat. No. 3,261,792; U.S. Pat. No. 3,268,501; U.S. Pat. No. 3,277,037; U.S. Pat. No. 3,281,386; U.S. Pat. No. 3,287,301; U.S. Pat. No. 3,285,869; U.S. Pat. No. 3,305,508; U.S. Pat. No. 3,310,151; U.S. Pat. No. 3,310,516; U.S. Pat. No. 3,313,759; U.S. Pat. No. 3,320,220; U.S. Pat. No. 3,294,719; GB1162569; GB1199325; U.S. Pat. No. 3,424,705; U.S. Pat. No. 3,445,414; SU265434; U.S. Pat. No. 3,503,917; U.S. Pat. No. 3,583,967; GB1327127; U.S. Pat. No. 3,644,263; U.S. Pat. No. 3,652,482; U.S. Pat. No. 3,808,166; U.S. Pat. No. 3,719,572; DE2245370; JP48038337; FR2153913; GB1296107; FR2172455; U.S. Pat. No. 3,815,655; U.S. Pat. No. 3,839,258; U.S. Pat. No. 3,842,052; GB1384591; U.S. Pat. No. 3,879,326; U.S. Pat. No. 3,892,698; U.S. Pat. No. 3,862,078; U.S. Pat. No. 3,879,327; U.S. Pat. No. 3,886,109; U.S. Pat. No. 3,920,601; JP51080344; JP50127950; JP54124042; JP54124040; U.S. Pat. No. 4,243,566; JP56161424; U.S. Pat. No. 4,344,859; SU1014834; JP58091702; SU1375629; JP1123834; SU520769 and RO102665; as well as U.S. Pat. No. 3,007,852; U.S. Pat. No. 3,622,127; U.S. Pat. No. 4,160,726; GB2051086; JP58147406; SU1058974; EP512736; JP8120124 and U.S. Pat. No. 6,075,073, also included herein by reference.

Solvent removal and latex concentration steps are for instance described in Chapter 9 of the Stanford Research Institute, PEP Report No. 82 of December 1972. Thus, an emulsion of polyisoprene/isopentane and an aqueous soap solution is passed to a hold tank where the emulsion is held for 3 hours, permitting any "cream" (emulsion with oversize particles) to rise to the top and be recycled. From the hold tank, the emulsion is passed to a heater where a substantial portion of the solvent (but only a minor portion of water) is vaporized into gaseous bubbles, causing formation of a foam resembling whipped cream. The foam is then cooled, causing the solvent to condense and the foam to collapse. The condensed solvent forms a separate liquid phase from the aqueous emulsion phase. The mixture passes through a coalescer packed with steel wool into a separator. The separated solvent is transferred to the solvent surge tank. The emulsion is centrifuged and concentrated in a centrifuge. This is repeated since the polymer particles in the concentrated emulsion still contain solvent. The latex in this reference is finally concentrated to 64% in a centrifuge and then collected and stored in a latex product storage vessel. This method or any similar method described in the literature may be used.

The following examples will further illustrate in greater detail how this invention may be carried out, but it is not intended that the invention be restricted in any way thereto.

Example 1

A polymer cement was made by dissolving a high cis polyisoprene (MW of about 3 million, made by anionic polymerization) into a volatile hydrocarbon solvent. This was done at a solids content of about 10% wt. An aqueous soap solution was prepared using a rosin-type soap at a concentration of from about 1-2% wt.

Experiments were carried out at 15-25° C. in an IR-latex emulsification unit consisting of a rotor/stator homogenizer (Cavitron CD1000 with conical rotor/stator system); a holding vessel (30 L glass double wall holding vessel equipped with a stirrer and inert gas system, max. pressure 1 bar g); a static mixer (120 cm length/2.54 cm diameter, with 24 mixing elements); and Gear pumps for pumping cement, soap and emulsion together with weighing systems for metering the different flows.

The rotor/stator homogenizer (#1) was used at a tip speed varying from 9-14/s. In addition, experiments were carried out within an experimental window wherein the cement/soap v/v ratio varied from 1.5 to 2.5; the soap solution concentration varied from 1 to 2% w, and wherein the cement solids content was maintained at about 11% w.

The product was recycled a number of times, and then send to the second rotor/stator homogenizer, operating at a speed of 18 m/s. The first step is referred to as the premix, the second as the emulsification. The results of the emulsification are set out in Table 2. Note that the emulsions have been used for the preparation of an artificial latex, by solvent removal, and all resulted in stable latexes with particle sizes within the required range of 0.5 to 2.0 μm.

TABLE 1

| Ex. 1 | Premix | | | | Emulsification | |
|---|---|---|---|---|---|---|
| | #1 | F | C | $N_{av}$ | Feed rate | #2 |
| i | 9 | 0.6 | 3 | 9 | 5 | 18 |
| ii | 9 | 0.6 | 3 | 7 | 3 | 18 |
| iii | 9 | 0.7 | 5 | 10 | 5 | 18 |
| iv | 9 | 0.7 | 5 | 11 | 5 | 18 |
| v | 14 | 0.7 | 5 | 11 | 5 | 18 |

1 = tip speed of homogenizer #1 in m/s
2 = tip speed of homogenizer #2 in m/s
F = feed rate premix (soap + cement) in L/min
C = recycle speed in L/min
$N_{av}$ = average number of premix cycles

TABLE 2

| Ex. 1 | Mw ret #1 | Mw ret #2 | Emulsion stability |
|---|---|---|---|
| i | 95 | 94 | stable |
| ii | 87 | 82 | stable |
| iii | 87 | 87 | stable |
| iv | 89 | 89 | stable |
| v | 88 | 85 | stable |

Mw ret #1 = the retention (in %) of Mw after homogenizer #1
Mw ret #2 = the retention (in %) of Mw after homogenizer #2
Emulsion stability is assessed (visual inspection) after at least 2 days.

Comparative Example 2

A polymer cement was made as described in Example 1. In this case, an amount of soap solution was transferred into the holding vessel. Polymer cement was continuously dosed into the recycle until the required soap/cement volume ratio was achieved. Subsequent experiments were carried out with only a static mixer in the recycle. Due to severe fouling and instability of the emulsion, this experiment had to be stopped. No latex was produced.

Comparative Example 3

A polymer cement was made as described in Example 1. In this case, an amount of soap solution was transferred into the holding vessel. Polymer cement was continuously dosed into the recycle until the required soap/cement volume ratio was achieved. Subsequent experiments were carried out without a static mixer and only homogenizer #1 operated between 9 m/s and 18 m/s. This process differs from that of the current invention, as the emulsion was not subjected to a low tip speed and a high tip speed homogenation step as required by the present invention. The Results are in Table 3.

Comparative Example 4

A polymer cement was made as described in Example 1. In this case, an amount of soap solution was transferred into the holding vessel. Polymer cement was continuously dosed into the recycle until the required soap/cement volume ratio was achieved. Subsequent experiments were carried out with a static mixer and only homogenizer #1 operated between 9 m/s and 18 m/s. Results are in Table 3.

TABLE 3

| Comp. ex. | F | C | #1 | Mw ret #1 | Emulsion stability |
|---|---|---|---|---|---|
| 2 | 0.3 | 3 | — | — | instable |
| 3 | 0.3 | 3 | 9 | 95 | instable |
| | 0.3 | 3 | 14 | 73 | instable |
| | 0.3 | 3 | 18 | 61 | stable |
| | 0.3 | 3 | 26 | 50 | stable |
| 4 | 0.3 | 3 | 9 | 95 | instable |
| | 0.3 | 3 | 14 | 85 | borderline |
| | 0.3 | 3 | 18 | 71 | stable |
| | 0.3 | 3 | 26 | 61 | stable |

1 = tip speed of homogenizer #1 in m/s
F = cement feed rate in L/min
C = recycle speed in L/min
Mw ret #1 = the retention (in %) of Mw after homogenizer #1
Emulsion stability is assessed (visual inspection) after at least 2 days.

CONCLUSION

In Example 1, stable emulsions were made with little loss in terms of the molecular weight of the rubber.

On the other hand, in Comparative Example 2, no homogenizer was used. The use of a static mixer alone is clearly insufficient. In Comparative Example 3 only a homogenizer was used and no static mixer to produce the premix. Comparative Example 4 is a modification thereof using a static mixture. Although it was possible in some instances to produce a stable emulsion, by using a higher the tip speed #1. On the other hand, by using a high tip speed without the low tip speed, the impact on the molecular weight was adverse and severe. Note in this respect that a stable oil-in-water emulsions may be used for the next step, wherein the artificial latex is made, but that the reduction in molecular weight cannot be reversed in such second step. Clearly therefore the results of Example 1 outperform even the best of Comparative Examples 3-4.

The invention claimed is:

1. A process of producing an artificial latex, comprising the steps:
  (a) dissolving polyisoprene rubber in n-pentane solvent wherein the amount of polyisoprene rubber dissolved in the n-pentane solvent is less than about 20 percent by weight thereby forming a cement;
  (b) emulsifying the cement with an aqueous rosin soap solution, wherein the rosin soap concentration is from 0.5 to 5.0% by weight in water and the volume ratio of aqueous soap solution versus cement is from 1:2.0 to 1:2.5 thus forming an oil-in-water emulsion; and
  (c) removing the n-pentane solvent, resulting in a latex of the polyisoprene rubber having particles of as median particle size in the range of from about 0.5 to 2.0 μm, wherein in step (b) a premix is formed first, wherein a first rotor/stator homogenizer is used for the preparation of the premix, wherein said first homogenizer is operated at a tip speed of the outer edge of the rotor/stator homogenizer in the range of 8 to 16 meters/second, and wherein the premix is subsequently homogenized in a second rotor/stator homogenizer operated at a tip speed of the outer edge of the rotor in a range from 18 to 30 meters/second into said oil-in-water emulsion using said second separate rotor/stator homogenizer for the subsequent preparation of the oil-in-water emulsion, wherein the premix is made in a continuous manner and the premix is recycled more than 5 times but less than 25 times and further including a product outlet after said second homogenizer, wherein the first and second rotor/stator homogenizers are part of a recycle loop further containing a holding vessel and a recycle pump, and wherein the cement and aqueous soap solution are introduced upstream from the first and second homogenizers, whereas the product outlet and the holding vessel are downstream of the second homogenizer.

* * * * *